US011776576B2

United States Patent
Li et al.

(10) Patent No.: US 11,776,576 B2
(45) Date of Patent: Oct. 3, 2023

(54) VIDEO GENERATION METHOD AND SYSTEM FOR HIGH RESOLUTION FACE SWAPPING

(71) Applicant: INSTITUTE OF AUTOMATION, CHINESE ACADEMY OF SCIENCES, Beijing (CN)

(72) Inventors: Qi Li, Beijing (CN); Zhenan Sun, Beijing (CN); Yuhao Zhu, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 171 days.

(21) Appl. No.: 17/623,247

(22) PCT Filed: Aug. 9, 2021

(86) PCT No.: PCT/CN2021/111577
§ 371 (c)(1),
(2) Date: Dec. 28, 2021

(87) PCT Pub. No.: WO2022/160657
PCT Pub. Date: Aug. 4, 2022

(65) Prior Publication Data
US 2023/0112462 A1    Apr. 13, 2023

(30) Foreign Application Priority Data
Jan. 29, 2021    (CN) .......................... 202110127788.2

(51) Int. Cl.
*G11B 27/031*    (2006.01)
*G06V 10/80*    (2022.01)
(Continued)

(52) U.S. Cl.
CPC ............ *G11B 27/031* (2013.01); *G06V 10/26* (2022.01); *G06V 10/774* (2022.01);
(Continued)

(58) Field of Classification Search
CPC .... G11B 27/031; G06V 10/806; G06V 20/70; G06V 40/168; G06V 20/46; G06V 10/26; G06V 10/774
See application file for complete search history.

(56) References Cited

U.S. PATENT DOCUMENTS 11,276,231 B2 *  3/2022  Chandran ............ G06V 10/754
2006/0093208 A1  5/2006  Li et al.
(Continued)

FOREIGN PATENT DOCUMENTS

CN    108932693 A    12/2018
CN    110868598 A    3/2020
(Continued)

*Primary Examiner* — Mishawn N. Hunter
(74) *Attorney, Agent, or Firm* — Bayramoglu Law Offices LLC

(57) ABSTRACT

A video generation method includes: obtaining a target face image and a source face image; extracting a feature of each of the source face image and the target face image through a face feature encoder, to obtain corresponding source feature codes and target feature codes; generating swapped face feature codes through a face feature exchanger according to the source feature codes and the target feature codes; generating an initial swapped face image through a face generator according to the swapped face feature codes; and fusing the initial swapped face image with the target face image through a face fuser, to obtain a final swapped face image. The face feature encoder performs hierarchical encoding on the face feature to reserve semantic details of a face, and the face feature exchanger performs further processing based on the hierarchical encoding, to obtain hier-
(Continued)

archical encoding of a swapped face feature with semantic details.

10 Claims, 2 Drawing Sheets

(51) Int. Cl.
*G06V 20/70* (2022.01)
*G06V 40/16* (2022.01)
*G06V 20/40* (2022.01)
*G06V 10/26* (2022.01)
*G06V 10/774* (2022.01)

(52) U.S. Cl.
CPC ............ *G06V 10/806* (2022.01); *G06V 20/46* (2022.01); *G06V 20/70* (2022.01); *G06V 40/168* (2022.01)

(56) References Cited

U.S. PATENT DOCUMENTS

2017/0109852 A1\* 4/2017 Ito .................... G06V 40/172
2020/0257786 A1   8/2020 Kim et al.
2020/0372621 A1\* 11/2020 Naruniec .................. G06T 7/32
2021/0056348 A1\*  2/2021 Berlin ..................... G06T 11/60

FOREIGN PATENT DOCUMENTS

| CN | 111368796 A | 7/2020 |
| CN | 111833257 A | 10/2020 |
| CN | 111861872 A | 10/2020 |
| CN | 112446364 A | 3/2021 |

\* cited by examiner

VIDEO GENERATION METHOD AND SYSTEM FOR HIGH RESOLUTION FACE SWAPPING

CROSS REFERENCE TO RELATED APPLICATIONS

This application is the national phase entry of International Application No. PCT/CN2021/111577, filed on Aug. 9, 2021, which is based upon and claims priority to Chinese Patent Application No. 202110127788.2, filed on Jan. 29, 2021, the entire contents of which are incorporated herein by reference.

TECHNICAL FIELD

The present disclosure relates to the field of image processing technologies, and in particular, to a target-independent video generation method and system for high resolution face swapping.

BACKGROUND

Image/video synthesizing methods for a swapped face is an important branch of image and video generation technology in the computer vision field. These methods aim to transfer a source face to a target face while maintaining identity information represented by the source face and detailed information such as posture and a facial expression of the target face.

With the widespread applications of deep learning theory, especially the rapid development of generative adversarial networks (GANs), most of the existing face swapping technologies use GANs-based models to synthesize vivid swapping images. But all current known target-independent face swapping architectures can only handle face swapping tasks at 256×256 resolution due to the three reasons as follows:
  information loss of face feature encoding;
  unstable training of a GAN; and
  hardware constraints, especially an insufficient memory of a graphics card.

The above three reasons hinder the optimization of an algorithm, or make the training of a GAN collapse, or cause a generated face to lack sufficient details so that the generated face is not different from a swapped face that is generated at 256×256 resolution. As a result, an image with face swapping is not sufficiently realistic.

SUMMARY

To solve the above problems in the prior art, that is, to obtain a video characterized by high resolution face swapping, the present disclosure provides a video generation method and system for high resolution face swapping.

To solve the above technical problems, the present disclosure provides the following solutions.

A video generation method for high resolution face swapping is provided. The video generation method includes:
  obtaining a target face image in a to-be-processed video and a corresponding source face image;
  extracting a feature of each of the source face image and the target face image through a face feature encoder, to obtain corresponding source feature codes and target feature codes;
  generating swapped face feature codes through a face feature exchanger according to the source feature codes and the target feature codes;
  generating an initial swapped face image through a face generator according to the swapped face feature codes; and
  fusing the initial swapped face image with the target face image through a face fuser that is based on face semantic segmentation, to obtain a final swapped face image.

Optionally, the video generation method further includes:
  determining a first loss function of the face feature encoder according to multiple history real face images; and
  iteratively adjusting a weight of the face feature encoder according to the first loss function by using a gradient backpropagation algorithm, until the first loss function converges to obtain an adjusted face feature encoder.

Optionally, the determining a first loss function of the face feature encoder according to multiple history real face images specifically includes:
  extracting a feature of each history real face image through the current face feature encoder, to obtain real feature codes;
  obtaining a reconstructed virtual face image through the face generator according to the real feature codes; and
  determining the first loss function according to each pair of a history real face image and a virtual face image.

Optionally, the first loss function $L_{inv}$ is determined according to the following formula:

$$L_{inv} = \lambda_1 L_{rec} + \lambda_2 L_{LPIPS} + \lambda_3 L_{id} + \lambda_4 L_{ldm};$$

where a first face reconstruction loss function $L_{rec}$:

$$L_{rec} = \|x - \hat{x}\|_2;$$

a first face sensing loss function $L_{LPIPS}$:

$$L_{PIPS} = \|F(x) - F(\hat{x})\|_2;$$

a first face identity loss function $L_{id}$:

$$L_{id} = 1 - \cos(R(x), R(\hat{x})); \text{ and}$$

a first face keypoint loss function $L_{ldm}$:

$$L_{ldm} = \|P(x) - P(\hat{x})\|_2;$$

where x represents a history real face image, $\hat{x}$ represents a virtual face image, $\|.\|_2$ represents Euclidean distance calculation, $F(.)$ represents a face feature extraction function, $R(.)$ represents a face recognition feature extraction function, $\cos(.,.)$ represents cosine similarity calculation, $P(.)$ represents a face keypoint extraction function, and each of $\lambda_1, \lambda_2, \lambda_3$, and $\lambda_4$ is a weight of the first loss function.

Optionally, the video generation method further includes:
  determining a second loss function of the face feature exchanger according to multiple history real face images and corresponding history target face images; and
  iteratively adjusting a weight of the face feature exchanger according to the second loss function by using a gradient backpropagation algorithm, until the second loss function converges to obtain an adjusted face feature exchanger.

Optionally, the determining a second loss function of the face feature exchanger according to multiple history real face images and corresponding history target face images specifically includes:
  for each group of history real face images and history target face images,
  extracting features of the history real face images and the history target face images respectively through the current face feature encoder, to obtain corresponding real feature codes and history target feature codes;

obtaining a corresponding reconstructed history virtual face image and a corresponding reconstructed history virtual target face image through the face generator according to each of the real feature codes and the history target feature codes;

generating history swapped face feature codes through the face feature exchanger according to the real feature codes and the history target feature codes;

obtaining a history swapped face image through the face generator according to the history swapped face feature codes; and determining the second loss function according to each group of history real face images, each group of history target face images, each group of history virtual face images, each group of history virtual target face images, and each group of history swapped face images.

Optionally, the second loss function $L_{swap}$ is determined according to the following formula:

$$L_{swap} = \varphi_1 L_{rec}' + \varphi_2 L_{LPIPS}' + \varphi_3 L_{id}' + \varphi_4 L_{ldm}' \varphi_5 L_{norm};$$

where a second face reconstruction loss function $L_{rec}'$:

$$L_{rec}' = \|x_s - \hat{x}_s\|_2 + \|x_t - \hat{x}_t\|_2;$$

a second face sensing loss function $L_{LPIPS}'$:

$$L_{LPIPS}' = \|F(x_t) - F(y_{s2t})\|_2;$$

a second face identity loss function $L_{id}'$;

$$L_{id}' = 1 - \cos(R(x_s), R(y_{s2t}));$$

a second face keypoint loss function $L_{ldm}'$:

$$L_{ldm}' = \|P(x_t) - P(y_{s2t})\|_2; \text{ and}$$

a regularization term $L_{norm}$:

$$L_{norm} = \|L_s^{high} - L_{s2t}\|_2;$$

where $x_s$ represents a history real face image, $\hat{x}_s$ represents a history virtual face image, $x_t$ represents a history target face image, $\hat{x}_t$ represents a history virtual target face image, $y_{s2t}$ represents a history swapped face image, $L_s^{high}$ represents a high-level semantic expression of a history real face image, $L_{s2t}$ represents a high-level semantic expression of a history swapped face image, $\|.\|_2$ represents Euclidean distance calculation, $F(.)$ represents a face feature extraction function, $R(.)$ represents a face recognition feature extraction function, $\cos(.,.)$ represents cosine similarity calculation, $P(.)$ represents a face keypoint extraction function, and each of $\varphi_1$, $\varphi_2$, $\varphi_3$, $\varphi_4$, and $\varphi_5$ is a weight of the second loss function.

To solve the above technical problems, the present disclosure further provides the following solutions:

A video generation system for high resolution face swapping is provided, where the video generation system includes:

an image obtaining device, configured to obtain a target face image in a to-be-processed video and a corresponding source face image;

a face feature encoder, configured to extract a feature of each of the source face image and the target face image, to obtain corresponding source feature codes and target feature codes;

a face feature exchanger, configured to generate swapped face feature codes according to the source feature codes and the target feature codes;

a face generator, configured to generate an initial swapped face image according to the swapped face feature codes; and a face fuser, configured to fuse the initial swapped face image with the target face image, to obtain a final swapped face image.

To solve the above technical problems, the present disclosure further provides the following solutions:

A video generation method for high resolution face swapping is provided, including:

a processor; and a memory, configured to store computer-executable instructions, where the executable instructions, when executed, cause the processor to perform the following operations:

obtaining a target face image in a to-be-processed video and a corresponding source face image;

extracting a feature of each of the source face image and the target face image through a face feature encoder, to obtain corresponding source feature codes and target feature codes;

generating swapped face feature codes through a face feature exchanger according to the source feature codes and the target feature codes;

generating an initial swapped face image through a face generator according to the swapped face feature codes; and fusing the initial swapped face image with the target face image through a face fuser that is based on face semantic segmentation, to obtain a final swapped face image.

To solve the above technical problems, the present disclosure further provides the following solutions:

A computer-readable storage medium is provided, where the computer-readable storage medium stores one or more programs, and the one or more programs, when executed by an electronic device including multiple application programs, cause the electronic device to perform the following operations:

obtaining a target face image in a to-be-processed video and a corresponding source face image;

extracting a feature of each of the source face image and the target face image through a face feature encoder, to obtain corresponding source feature codes and target feature codes;

generating swapped face feature codes through a face feature exchanger according to the source feature codes and the target feature codes;

generating an initial swapped face image through a face generator according to the swapped face feature codes; and fusing the initial swapped face image with the target face image through a face fuser that is based on face semantic segmentation, to obtain a final swapped face image.

Based on embodiments of the present disclosure, the present disclosure discloses the following technical effects:

In the present disclosure, the face feature encoder performs hierarchical encoding on the face feature to reserve semantic details of a face as much as possible, the face feature exchanger performs further processing based on the hierarchical encoding, to obtain hierarchical encoding of a swapped face feature with semantic details, the face generator generates the initial swapped face image, and the face fuser fuses the initial swapped face image with the target face image, to obtain the final swapped face image. Therefore, a high resolution face swapping video can be obtained.

Figure 1:
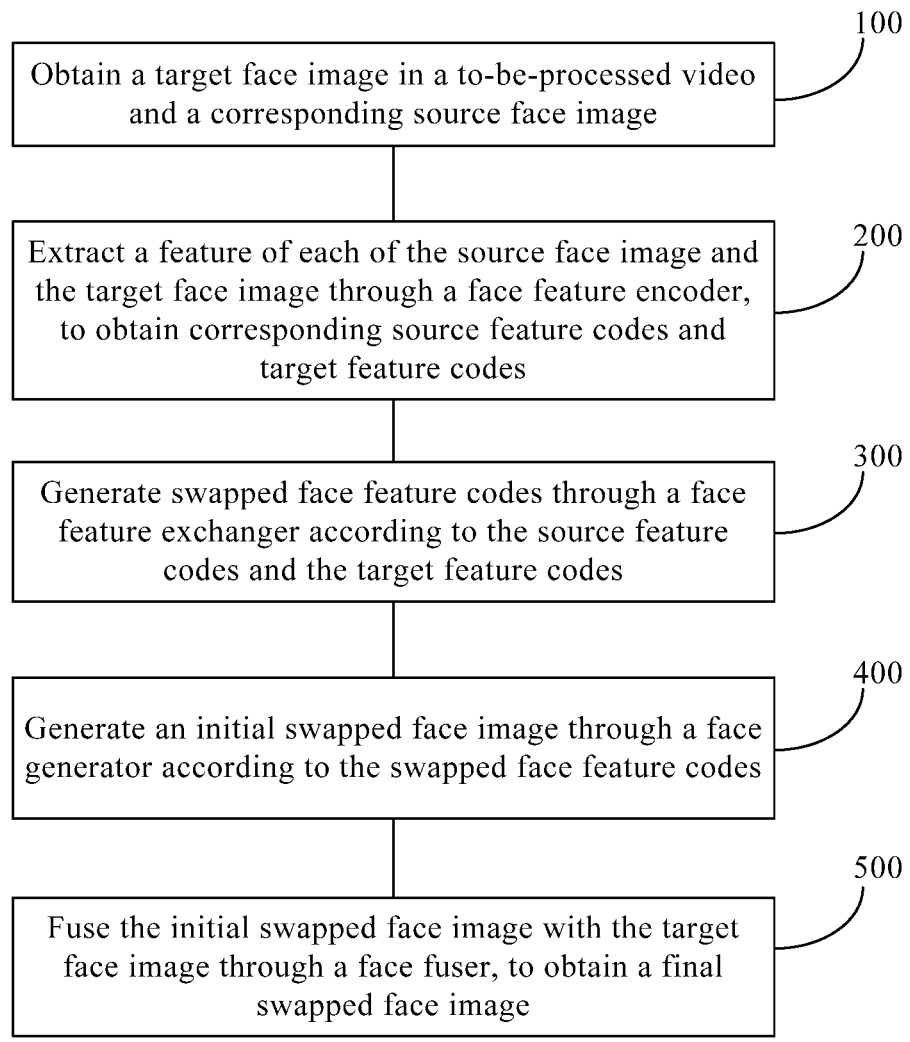
FIG. 1 is a flowchart of a video generation method for high resolution face swapping according to the present disclosure.

Descriptions of Reference Numerals:

Image obtaining device—1, face feature encoder—2, face feature exchanger—3, face generator—4, and face fuser—5.

DETAILED DESCRIPTION OF THE EMBODIMENTS

The preferred implementations of the present disclosure are described below with reference to the accompanying drawings. Those skilled in the art should understand that the implementations herein are merely intended to explain the technical principles of the present disclosure, rather than to limit the protection scope of the present disclosure.

The present disclosure provides a video generation method for high resolution face swapping. The face feature encoder performs hierarchical encoding on the face feature to reserve semantic details of a face as much as possible, the face feature exchanger performs further processing based on the hierarchical encoding, to obtain hierarchical encoding of a swapped face feature with semantic details, the face generator generates the initial swapped face image, and the face fuser fuses the initial swapped face image with the target face image, to obtain the final swapped face image. Therefore, a high resolution face swapping video can be obtained.

To make the above objectives, features, and advantages of the present disclosure clearer and more comprehensible, the present disclosure will be further described in detail below with reference to the accompanying drawings and the specific examples.

As shown in FIG. 1, the video generation method for high resolution face swapping in the present disclosure includes:

Step 100: Obtain a target face image in a to-be-processed video and a corresponding source face image.

Step 200: Extract a feature of each of the source face image and the target face image through a face feature encoder, to obtain corresponding source feature codes and target feature codes.

Step 300: Generate swapped face feature codes through a face feature exchanger according to the source feature codes and the target feature codes.

In the present disclosure, the face feature exchanger that performs piecewise nonlinear optimization is used, and swapped face feature codes is obtained by manipulating global feature codes of the face, to avoid local distortion of the generated face.

Step 400: Generate an initial swapped face image through a face generator according to the swapped face feature codes.

Step 500: Fuse the initial swapped face image with the target face image through a face fuser that is based on face semantic segmentation, to obtain a final swapped face image.

Preferably, before step 100 is performed, the face feature encoder may be optimized first. Specifically, the video generation method for high resolution face swapping in the present disclosure further includes:

Step A1: Determine a first loss function of the face feature encoder according to multiple history real face images.

Step A2: Iteratively adjust a weight of the face feature encoder according to the first loss function by using a gradient backpropagation algorithm, until the first loss function converges to obtain an adjusted face feature encoder.

Further, in step A1, the determining a first loss function of the face feature encoder according to multiple history real face images specifically includes:

Step A11: Extract a feature of each history real face image through the current face feature encoder, to obtain real feature codes [C, $L^{low}$, $L^{high}$], where C represents a basic information expression of a face feature, $L^{low}$ represents a low-level semantic expression, and $L^{high}$ represents a high-level semantic expression.

Step A12: Obtain a reconstructed virtual face image through the face generator according to the real feature codes.

Step A13: Determine the first loss function according to each pair of a history real face image and a virtual face image.

Specifically, the first loss function $L_{inv}$ may be determined according to the following formula:

$$L_{inv} = \lambda_1 L_{rec} + \lambda_2 L_{LPIPS} + \lambda_3 L_{id} + \lambda_4 L_{ldm};$$

where a first face reconstruction loss function $L_{rec}$:

$$L_{rec} = \|x - \hat{x}\|_2;$$

a first face sensing loss function $L_{LPIPS}$:

$$L_{PIPS} = \|F(x) - F(\hat{x})\|_2;$$

a first face identity loss function $L_{id}$:

$$L_{id} = 1 - \cos(R(x), R(\hat{x})); \text{ and}$$

a first face keypoint loss function $L_{ldm}$:

$$L_{ldm} = \|P(x) - P(\hat{x})\|_2;$$

where x represents a history real face image, $\hat{x}$ represents a virtual face image, $\|.\|_2$ represents Euclidean distance calculation, F(.) represents a face feature extraction function, R(.) represents a face recognition feature extraction function, cos(.,.) represents cosine similarity calculation, P(.) represents a face keypoint extraction function, and each of $\|_1$, $\lambda_2$, $\lambda_3$, and $\lambda_4$ is a weight of the first loss function.

Further, after step A1 is performed to optimize the face feature encoder, and before step 100 is performed, the face feature exchanger is further optimized. Specifically, the video generation method for high resolution face swapping in the present disclosure further includes:

Step B1: Determine a second loss function of the face feature exchanger according to multiple history real face images and corresponding history target face images.

Step B2: Iteratively adjust a weight of the face feature exchanger according to the second loss function by using a gradient backpropagation algorithm, until the second loss function converges to obtain an adjusted face feature exchanger.

Further, in step B1, the determining a second loss function of the face feature exchanger according to multiple history real face images and corresponding history target face images specifically includes:

Step B11: For each group of history real face images and history target face images, extract features of the history real face images and the history target face images respectively through the current face feature encoder, to obtain corresponding real feature codes and history target feature codes.

Step B12: Obtain a corresponding reconstructed history virtual face image and a corresponding reconstructed history virtual target face image through the face generator according to each of the real feature codes and the history target feature codes.

Step B13: Generate history swapped face feature codes through the face feature exchanger according to the real feature codes and the history target feature codes.

Step B14: Obtain a history swapped face image through the face generator according to the history swapped face feature codes.

Step B15: Determine the second loss function according to each group of history real face images, each group of history target face images, each group of history virtual face images, each group of history virtual target face images, and each group of history swapped face images.

Specifically, the second loss function $L_{swap}$ may be determined according to the following formula:

$$L_{swap}=\varphi_1 L_{rec}'+\varphi_2 L_{LPIPS}'+\varphi_3 L_{id}'+\varphi_4 L_{ldm}'+\varphi_5 L_{norm};$$

where a second face reconstruction loss function $L_{rec}'$:

$$L_{rec}'=\|x_s-\hat{x}_s\|_2+\|x_t-\hat{x}_t\|_2;$$

a second face sensing loss function $L_{LPIPS}'$:

$$L_{LPIPS}'=\|F(x_t)-F(y_{s2t})\|_2;$$

a second face identity loss function $L_{id}'$:

$$L_{id}'=1-\cos(R(x_s),R(y_{s2t}));$$

a second face keypoint loss function $L_{ldm}'$:

$$L_{ldm}'=\|P(x_t)-P(y_{s2t})\|_2; \text{ and}$$

a regularization term $L_{norm}$:

$$L_{norm}=\|L_s^{high}-L_{s2t}\|_2;$$

where $x_s$ represents a history real face image, $\hat{x}_s$ represents a history virtual face image, $x_t$ represents a history target face image, $\hat{x}_t$ represents a history virtual target face image, $y_{s2t}$ represents a history swapped face image, $L_s^{high}$ represents a high-level semantic expression of a history real face image, $L_{s2t}$ represents a high-level semantic expression of a history swapped face image, $\|.\|_2$ represents Euclidean distance calculation, $F(.)$ represents a face feature extraction function, $R(.)$ represents a face recognition feature extraction function, $\cos(.,.)$ represents cosine similarity calculation, $P(.)$ represents a face keypoint extraction function, and each of $\varphi_1$, $\varphi_2$, $\varphi_3$, $\varphi_4$, and $\varphi_5$ is a weight of the second loss function.

Processing steps for obtaining the history virtual face image $\hat{x}_s$ and the history virtual target face image $\hat{x}_t$ are the same as step A11 to step A13, and are not repeated again.

The present disclosure is based on the pre-trained face generator and face fuser, and a piecewise training policy is used to reduce dependence on hardware.

In step 500, the face fuser fuses the swapped face image with background of the face in the target face image, to obtain a final swapped face image, and a high resolution face swapping video is formed based on each frame of final swapped face image.

In the present disclosure, phased model design is used to achieve high resolution video face swapping at the megapixel level. The model mainly includes four parts: the face feature encoder that performs hierarchical encoding, the face feature exchanger that performs piecewise nonlinear optimization, the face generator based on StyleGAN (v1 or v2), and the face fuser based on face semantic segmentation. The face feature encoder uses a face image as an input to obtain a hierarchical feature expression of the face. The face feature exchanger performs feature exchange on hierarchical feature expressions of the source face and the target face, to obtain a face-level feature expression after swapping. The face generator uses the face-level feature expression obtained after swapping as an input to obtain a face after swapping.

Finally, in video processing, the face fuser fuses the face obtained after swapping with the background of the target face, to obtain a current face frame after swapping.

To ensure desirable training stability of the model and reduce high requirements on hardware, in the present disclosure, a phased training method is used, that is, based on the pre-trained face generator and face fuser, the face feature encoder is first trained, and then the face exchanger is trained.

To monitor the training process of the model, in the present disclosure, a face reconstruction loss, a face sensing loss, a face identity loss, and a face keypoint loss are used to constrain the face feature encoder, and a face reconstruction loss, a face sensing loss, a face identity loss, a face keypoint loss, and a regularization term are used to constrain the face feature exchanger. Specifically, the face feature encoder is responsible for performing hierarchical encoding on the face feature to reserve semantic details of a face as much as possible, and the face feature exchanger performs control based on the hierarchical encoding, to obtain hierarchical encoding of a swapped face feature with semantic details, so that the face generator generates the swapped face.

Figure 2:
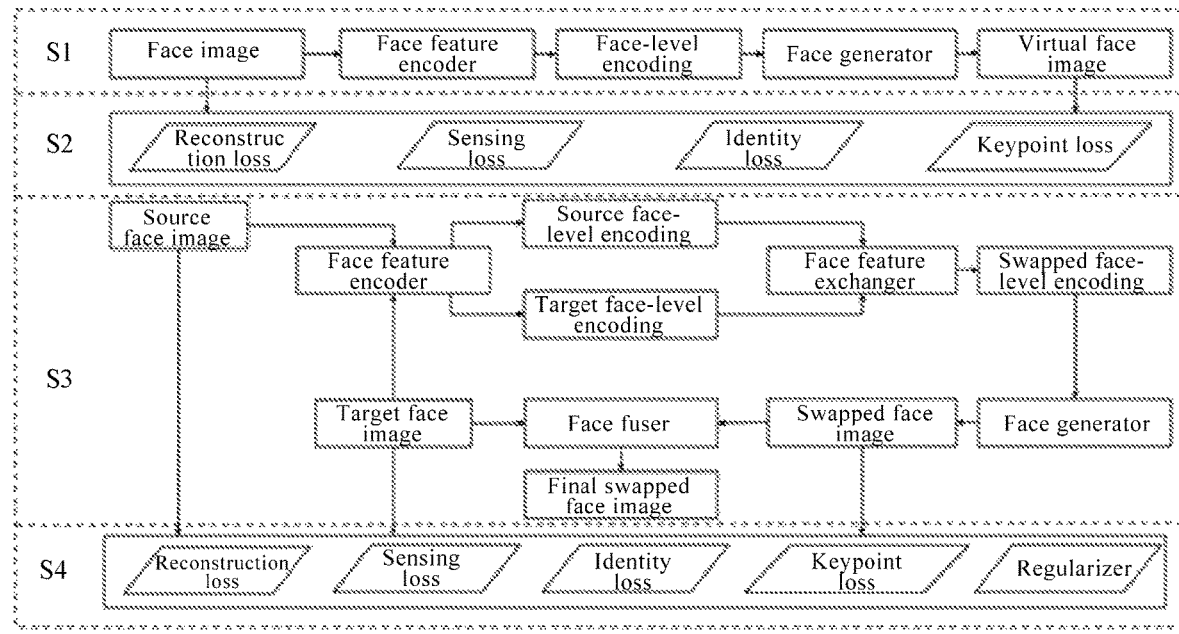
FIG. 2 is a flowchart of a specific implementation of a video generation method for high resolution face swapping according to the present disclosure.

The present disclosure is described in detail below with a specific embodiment (as shown in FIG. 2):

Step S1: Reconstruct a history real face image. Step S1 specifically includes the following process:

Step S11: Extract a feature of the history real face image to obtain face-level encoding [C, $L^{low}$, $L^{high}$] (that is, real feature codes) of the history real face.

Step S12: Input the face-level encoding into the face generator to obtain a reconstructed virtual face image.

Step S2: Calculate a first face reconstruction loss, a first face sensing loss, a first face identity loss, and a first face keypoint loss according to the real face image and the virtual face image, and iteratively adjust a weight of the face feature encoder by using a loss gradient backpropagation algorithm, until convergence occurs.

Step S2 specifically includes the following sub-steps:

Step S21: Determine a first loss function based on the virtual face image obtained in step S12 and the real face image. The first loss function is divided into four parts: a first face reconstruction loss function, a first face sensing loss function, a first face identity loss function, and a first face keypoint loss function.

Step S22: Iteratively adjust the weight of the face feature encoder based on losses of the first face reconstruction loss function, the first face sensing loss function, the first face identity loss function, and the first face keypoint loss function by using a gradient backpropagation algorithm, until convergence occurs.

Step S3: Fuse the source face image with the target face image. Step S3 specifically includes the following process:

Step S31: Extract a feature of each of the source face image and the target face image to obtain hierarchical encoding of the source face image and the target face image.

Step S32: Input source face-level encoding and target face-level encoding into the face exchanger to obtain swapped face-level encoding.

Step S33: Input the swapped face-level encoding into the face generator to obtain a swapped face image.

Step S34: Input the swapped face image and the target face image into the face fuser, to fuse the face part of the swapped face image with the background part of the target face image to obtain a final swapped face image.

Each time after a swapped face image is obtained, the face feature exchanger may be further optimized according to the currently obtained swapped face image, the source face image, and the target face image. Specifically:

Step S4: Determine a second face reconstruction loss function, a second face sensing loss function, a second face identity loss function, a second face keypoint loss function, and a regularization term according to the swapped face image, the source face image, and the target face image, and iteratively adjust a weight of the face feature exchanger by using a loss gradient backpropagation algorithm, until convergence occurs.

Step S4 specifically includes the following steps:

Step S41: Determine a second loss function based on the swapped face image obtained in step S33, the source face image, and the target face image, where the second loss function is divided into five parts: a second face sensing loss function, a second face identity loss function, a second face keypoint loss function, and a regular term.

Step S42: Iteratively adjust a weight of the face feature exchanger based on the second face sensing loss function, the second face identity loss function, the second face keypoint loss function, and the regularization term by using a gradient backpropagation algorithm, until convergence occurs.

In the present disclosure, the target-independent face swapping capability at the megapixel level is achieved through the piecewise face feature encoder, the piecewise face feature exchanger, the piecewise face generator, and the piecewise face fuser. Specifically, the face feature encoder performs hierarchical encoding to obtain a complete feature expression of a face, the face feature exchanger performs piecewise nonlinear optimization to obtain a complete feature expression of a swapped face, the face generator uses the complete feature expression of the swapped face to generate a swapped face with rich details at the resolution of 1024×1024, and finally the face fuser fuses the swapped face with the background of the target face.

In addition, the present disclosure further provides a video generation system for high resolution face swapping, so that a video characterized by high resolution face swapping can be obtained.

Figure 3:
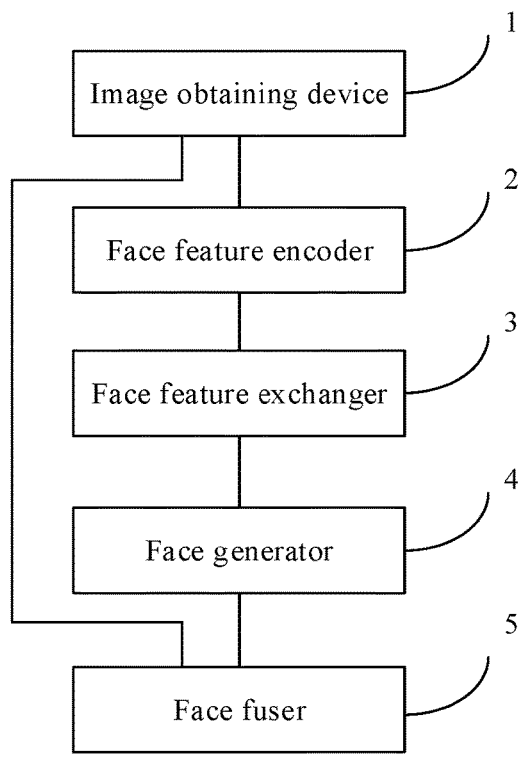
FIG. 3 is a schematic diagram of a modular structure of a video generation system for high resolution face swapping according to the present disclosure.

As shown in FIG. 3, the video generation system for high resolution face swapping in the present disclosure includes an image obtaining device 1, a face feature encoder 2, a face feature exchanger 3, a face generator 4, and a face fuser 5.

The image obtaining device 1 is configured to obtain a target face image in a to-be-processed video and a corresponding source face image.

The face feature encoder 2 is configured to extract a feature of each of the source face image and the target face image, to obtain corresponding source feature codes and target feature codes.

The face feature exchanger 3 is configured to generate swapped face feature codes according to the source feature codes and the target feature codes.

The face generator 4 is configured to generate an initial swapped face image according to the swapped face feature codes.

The face fuser 5 is configured to fuse the initial swapped face image with the target face image, to obtain a final swapped face image.

Besides, the present disclosure further provides the following solutions:

A video generation method for high resolution face swapping is provided, including:
a processor; and
a memory, configured to store computer-executable instructions, where the executable instructions, when executed, cause the processor to perform the following operations:
obtaining a target face image in a to-be-processed video and a corresponding source face image;
extracting a feature of each of the source face image and the target face image through a face feature encoder, to obtain corresponding source feature codes and target feature codes;
generating swapped face feature codes through a face feature exchanger according to the source feature codes and the target feature codes;
generating an initial swapped face image through a face generator according to the swapped face feature codes; and
fusing the initial swapped face image with the target face image through a face fuser that is based on face semantic segmentation, to obtain a final swapped face image.

To solve the above technical problems, the present disclosure further provides the following solutions:

A computer-readable storage medium is provided, where the computer-readable storage medium stores one or more programs, and the one or more programs, when executed by an electronic device including multiple application programs, cause the electronic device to perform the following operations:
obtaining a target face image in a to-be-processed video and a corresponding source face image;
extracting a feature of each of the source face image and the target face image through a face feature encoder, to obtain corresponding source feature codes and target feature codes;
generating swapped face feature codes through a face feature exchanger according to the source feature codes and the target feature codes;
generating an initial swapped face image through a face generator according to the swapped face feature codes; and
fusing the initial swapped face image with the target face image through a face fuser that is based on face semantic segmentation, to obtain a final swapped face image.

Compared with the prior art, the video generation system for high resolution face swapping and the computer-readable storage medium in the present disclosure have the same beneficial effects as those of the above video generation method for high resolution face swapping, and will not be repeated herein.

The technical solutions of the present disclosure are described with reference to the preferred implementations and drawings. Those skilled in the art should easily understand that the protection scope of the present disclosure is not limited to these specific implementations. A skilled in the art can make equivalent changes or substitutions to the relevant technical features without departing from the principles of the present disclosure, and the technical solutions after these changes or substitutions should fall within the protection scope of the present disclosure.

What is claimed is:

1. A video generation method for high resolution face swapping, wherein the video generation method comprises:
obtaining a target face image in a to-be-processed video and a source face image corresponding to the target face image;

extracting a feature of each of the source face image and the target face image through a face feature encoder, to obtain source feature codes corresponding to the source face image and target feature codes corresponding to the target face image;

generating swapped face feature codes through a face feature exchanger according to the source feature codes and the target feature codes;

generating an initial swapped face image through a face generator according to the swapped face feature codes; and fusing the initial swapped face image with the target face image through a face fuser, wherein the face fuser is based on face semantic segmentation, to obtain a final swapped face image.

2. The video generation method according to claim 1, wherein the video generation method further comprises:

determining a first loss function of the face feature encoder according to a plurality of history real face images; and iteratively adjusting a weight of the face feature encoder according to the first loss function by using a gradient backpropagation algorithm, until the first loss function converges to obtain an adjusted face feature encoder.

3. The video generation method according to claim 2, wherein the step of determining the first loss function of the face feature encoder according to the plurality of history real face images specifically comprises:

extracting a feature of each of the plurality of history real face images through a current face feature encoder, to obtain real feature codes;

obtaining a reconstructed virtual face image through the face generator according to the real feature codes; and determining the first loss function according to each pair of a history real face image and a virtual face image.

4. The video generation method according to claim 3, wherein the first loss function $L_{inv}$ is determined according to the following formula:

$$L_{inv}=\lambda_1 L_{rec}+\lambda_2 L_{LPIPS}+\lambda_3 L_{id}+\lambda_4 L_{ldm};$$

wherein a first face reconstruction loss function $L_{rec}$:

$$L_{rec}=\|x-\hat{x}\|_2;$$

a first face sensing loss function $L_{LPIPS}$:

$$L_{LPIPS}=\|F(x)-F(\hat{x})\|_2;$$

a first face identity loss function $L_{id}$:

$$L_{id}=1-\cos(R(x),R(\hat{x})); \text{ and}$$

a first face keypoint loss function $L_{ldm}$:

$$L_{ldm}=\|P(x)-P(\hat{x})\|_2;$$

wherein x represents the history real face image, $\hat{x}$ represents the virtual face image, $\|.\|_2$ represents Euclidean distance calculation, F(.) represents a face feature extraction function, R(.) represents a face recognition feature extraction function, cos(.,.) represents cosine similarity calculation, P(.) represents a face keypoint extraction function, and each of $\lambda_1$, $\lambda_2$, $\lambda_3$, and $\lambda_4$ is a weight of the first loss function.

5. The video generation method according to claim 1, wherein the video generation method further comprises:

determining a second loss function of the face feature exchanger according to history real face images and history target face images corresponding to the history real face images; and iteratively adjusting a weight of the face feature exchanger according to the second loss function by using a gradient backpropagation algorithm, until the second loss function converges to obtain an adjusted face feature exchanger.

6. The video generation method according to claim 5, wherein the step of determining the second loss function of the face feature exchanger according to the history real face images and history target face images corresponding to the history real face images specifically comprises:

for each group of the history real face images and the history target face images, extracting features of the each group of the history real face images and the history target face images respectively through a current face feature encoder, to obtain real feature codes corresponding to the history real face images and history target feature codes corresponding to the history target face images;

obtaining a reconstructed history virtual face image corresponding to the real feature codes and a reconstructed history virtual target face image corresponding to the history target feature codes through the face generator according to each of the real feature codes and the history target feature codes;

generating history swapped face feature codes through the face feature exchanger according to the real feature codes and the history target feature codes;

obtaining a history swapped face image through the face generator according to the history swapped face feature codes; and determining the second loss function according to each group of history real face images, each group of history target face images, each group of history virtual face images, each group of history virtual target face images, and each group of history swapped face images.

7. The video generation method according to claim 6, wherein the second loss function $L_{swap}$ is determined according to the following formula:

$$L_{swap}=\varphi_1 L_{rec}'+\varphi_2 L_{LPIPS}'+\varphi_3 L_{id}'+\varphi_4 L_{ldm}'+\varphi_5 L_{norm};$$

wherein a second face reconstruction loss function $L_{rec}'$:

$$L_{rec}'=\|x_s-\hat{x}_s\|_2+\|x_t-\hat{x}_t\|_2;$$

a second face sensing loss function $L_{LPIPS}'$:

$$L_{LPIPS}'=\|F(x_t)-F(y_{s2t})\|_2;$$

a second face identity loss function $L_{id}'$:

$$L_{id}'=1-\cos(R(x_s),R(y_{s2t}));$$

a second face keypoint loss function $L_{ldm}'$:

$$L_{ldm}'=\|P(x_t)-P(y_{s2t})\|_2; \text{ and}$$

a regularization term $L_{norm}$;

$$L_{norm}=\|L_s^{high}-L_{s2t}\|_2;$$

wherein $x_s$ represents a history real face image, $\hat{x}_s$ represents a history virtual face image, $x_t$ represents a history target face image, $\hat{x}_t$ represents a history virtual target face image, $y_{s2t}$ represents a history swapped face image, $L_s^{high}$ represents a high-level semantic expression of the history real face image, $L_{s2t}$ represents a high-level semantic expression of the history swapped face image, $\|.\|_2$ represents Euclidean distance calculation, F(.) represents a face feature extraction function, R(.) represents a face recognition feature extraction function, cos(.,.) represents cosine similarity calculation, P(.) represents a face keypoint extraction function, and each of $\varphi_1$, $\varphi_2$, $\varphi_3$, $\varphi_4$, and $\varphi_5$ is a weight of the second loss function.

8. A video generation system for high resolution face swapping, wherein the video generation system comprises:
- an image obtaining device, configured to obtain a target face image in a to-be-processed video and a source face image corresponding to the target face image;
- a face feature encoder, configured to extract a feature of each of the source face image and the target face image, to obtain source feature codes corresponding to the source face image and target feature codes corresponding to the target face image;
- a face feature exchanger, configured to generate swapped face feature codes according to the source feature codes and the target feature codes;
- a face generator, configured to generate an initial swapped face image according to the swapped face feature codes; and
- a face fuser, configured to fuse the initial swapped face image with the target face image, to obtain a final swapped face image.

9. A video generation method for high resolution face swapping, comprising:
- a processor; and
- a memory, configured to store computer-executable instructions, wherein the executable instructions, when executed, cause the processor to perform the following operations:
- obtaining a target face image in a to-be-processed video and a source face image corresponding to the target face image;
- extracting a feature of each of the source face image and the target face image through a face feature encoder, to obtain source feature codes corresponding to the source face image and target feature codes corresponding to the target face image;
- generating swapped face feature codes through a face feature exchanger according to the source feature codes and the target feature codes;
- generating an initial swapped face image through a face generator according to the swapped face feature codes; and
- fusing the initial swapped face image with the target face image through a face fuser, wherein the face fuser is based on face semantic segmentation, to obtain a final swapped face image.

10. A non-transitory computer-readable storage medium, wherein the non-transitory computer-readable storage medium stores on or more programs, and the one or more programs, when executed by an electronic device comprising a plurality of application programs, cause the electronic device to perform the following operations:
- obtaining a target face image in a to-be-processed video and a source face image corresponding to the target face image;
- extracting a feature of each of the source face image and the target face image through a face feature encoder, to obtain source feature codes corresponding to the source face image and target feature codes corresponding to the target face image;
- generating swapped face feature codes through a face feature exchanger according to the source feature codes and the target feature codes;
- generating an initial swapped face image through a face generator according to the swapped face feature codes; and
- fusing the initial swapped face image with the target face image through a face fuser, wherein the face fuser is based on face semantic segmentation, to obtain a final swapped face image.

\* \* \* \* \*